Sept. 3, 1968    E. P. JOHNSON, JR.. ET AL    3,399,590
ELECTROOPTICAL SHAFT ENCODER
Filed March 23, 1964    4 Sheets-Sheet 1

INVENTORS
EUGENE P. JOHNSON, JR.
HARRY W. A. VANDERMEER
ATTORNEYS

INVENTORS
EUGENE P. JOHNSON, JR.
HARRY W. A. VANDERMEER

ATTORNEYS

Sept. 3, 1968  E. P. JOHNSON, JR., ET AL  3,399,590

ELECTROOPTICAL SHAFT ENCODER

Filed March 23, 1964  4 Sheets-Sheet 3

INVENTORS
EUGENE P. JOHNSON, JR.
HARRY W. A. VANDERMEER

ATTORNEYS

Sept. 3, 1968    E. P. JOHNSON, JR., ET AL    3,399,590
ELECTROOPTICAL SHAFT ENCODER Filed March 23, 1964    4 Sheets-Sheet 4

INVENTORS
EUGENE P. JOHNSON, JR.
HARRY W. A. VANDERMEER

ATTORNEYS

United States Patent Office 3,399,590
Patented Sept. 3, 1968

3,399,590
ELECTROOPTICAL SHAFT ENCODER
Eugene P. Johnson, Jr., Woburn, and Harry W. A. Vandermeer, Chelmsford, Mass., assignors, by direct and mesne assignments, to Dynamics Research Corporation, Stoneham, Mass., a corporation of Massachusetts
Filed Mar. 23, 1964, Ser. No. 353,911
4 Claims. (Cl. 88—14)

ABSTRACT OF THE DISCLOSURE

A shaft position indicator which employs a group of mirrors symmetrically disposed around the shaft and fixed to rotate with the shaft. These mirrors are surrounded by a group of stationary mirrors fixed to a mechanical reference point. Also fixed to this mechanical reference point are a spherical mirror, a light source, and a photosensing element. The light source and photosensing element are arranged behind a mask having a slit pattern in it. The elements are positioned so that light is shone through the slit pattern, reflects from the rotating to the stationary mirrors until it reaches the spherical mirror, is there inverted and reflected back to the slit pattern and the photosensing element.

---

This invention relates to shaft position indicators and more particularly to an improved system for determining and indicating when a shaft position indicator is at its zero position.

Shaft position indicators are available in many different designs for many different uses. Of particular interest to the present invention is the kind known as "shaft angle encoders" which yield a series of output signals for successive shaft positions. Shaft angle encoders are commonly used in navigation, guidance and surveillance systems where state-of-the-art performance requirements have created a demand for maximum resolution and accuracy. Some encoders yield different coded output signals for different predetermined shaft positions. This kind of encoder is commonly called an "absolute encoder" since each output signal provides directly an absolute value indication of a particular shaft position. Other encoders yield a series of like signals for different predetermined shaft positions which are spaced by identical increments of angle. This latter kind of encoder is commonly called an "incremental encoder" since the occurrence of each output signal is an indication that a predetermined increment of shaft rotation has occurred. With an incremental encoder absolute shaft position is attained by counting the pulses with reference to a predetermined reference or "zero" position. A forward-backward counter is used to add or subtract output pulses with relation to the counter total in accordance with the direction of shaft angle rotation. However, for the sake of reliability, it is customary to provide for automatic resetting of the counter to zero independently of the algebraic sum of pulses received by the counter whenever the shaft passes through the zero position. This approach requires a pulse generating system which is triggered directly by shaft position. However, this independent pulse generating system must be highly accurate and must have a zero position resolving power better than the encoder's shaft angle resolving power. In practice this is complicated not only by the need for the zero reference signal to have a high signal to noise ratio and steep leading and trailing edges, but also by shaft or bearing eccentricity which causes lateral shaft displacement having both X and/or Y vector components.

On the contrary the primary object of this invention is to provide a zero reference signal generating system for a shaft position indicator which not only provides a sharply defined output signal with a signal to noise ratio such that by means of state-of-the-art electronics the signal can easily be clipped off above the maximum noise level and has an accuracy which is substantially independent of shaft eccentricity but also has a resolution that can be essentially lower than that of the encoder system itself but which output signal combined with that of the encoder system yields a high resolution overall output with an unambiguous zero-reference indication.

Currently the most accurate shaft angle encoders are of the optical variety, employing a rotatable code disc having one or more circular tracks of alternately occurring opaque and transparent code elements, an illumination system designed to illuminate a series of like code elements in each track, and means for generating an output signal varying in accordance with the amount of light passed by each track. This type of encoder is not only capable of great accuracy and resolution but also can be made compact, is highly reliable and can withstand shock and large acceleration forces. Because these characteristics are directly attributable to the fact that the encoder system is optical in nature, practical considerations make it necessary that any zero reference signal generating system embodied therein also be optical in nature.

Accordingly a more specific object of the present invention is to provide an improved optical reference system for a shaft position indicator, the improved system comprising optical means for fully transmitting a light beam of predetermined cross-sectional configuration to a detector only when a given shaft is in one or more given reference positions and of transmitting less than the entire beam at other shaft positions.

Described briefly the present invention comprises optical means for fully transmitting a light beam of predetermined cross-sectional configuration only when a given shaft is in one of several predetermined positions and of transmitting less than the entire beam at all other positions, plus light responsive means for generating an output signal indicative of zero at only one of said predetermined positions. If desired, output signals also may be derived at each of the other predetermined positions for reference purposes. The light beam is caused to travel about the axis of rotation of the given shaft in a multiple reflection path which cancels out the effect of any lateral shaft displacement caused by shaft or bearing eccentricity. The multiple reflection path provides a gain in optical sensitivity which is reflected in a relatively high resolution due to an angular gain factor of 2 for every single reflection at a rotating mirror.

Other objects and many of the attendant advantages of the present invention will become more readily apparent when reference is had to the following detailed specification when considered together with the accompanying drawings wherein.

As herein illustrated the present invention consists of two basic parts: (1) a pattern-imaging system and (2) a symmetric rotating mirror system. The pattern-imaging system involves two identical slit patterns and the use of a concave mirror which acts as a lens to image the first slit pattern upon the second slit pattern when the center of curvature of the concave mirror is located in the plane of the slit patterns. The slit patterns are described in more detail hereinafter.

Figure 1:
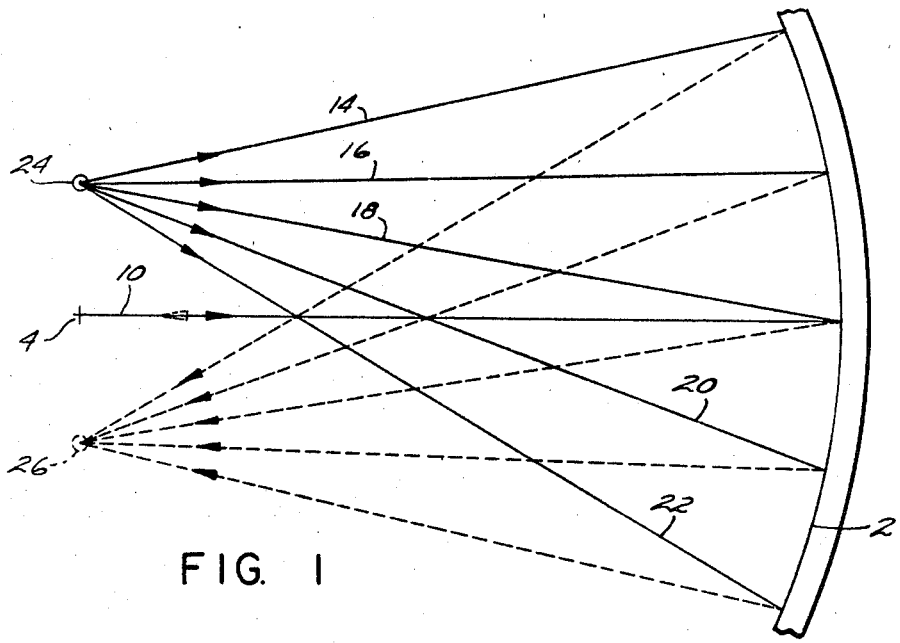
FIG. 1 illustrates the principle of a concave lens which is embodied in the system of FIGS. 4–10.

The principle of the concave mirror is shown in FIG. 1 where the concave surface of the mirror is identified at 2. The mirror surface is a portion of a sphere having a center of curvature indicated at 4. Any light ray emanating from the center of this sphere strikes the mirror surface perpendicularly and is reflected back toward the center of the sphere. This is shown by the light ray 10. However, light rays emanating from any other point are reflected from the sphere in such a way that they make equal and opposite angles at the surface with respect to the local normals, as exemplified by the light rays 14 to 22 each of which emanates from an object point 24 and is reflected back to an image point 26 by way of equal and opposite angles of incidence and reflection made with respect to the local normals. The reflected rays are shown in dotted lines. It is believed to be apparent from FIG. 1 that if an object point is near the center of curvature as, for example, the object point 24, the bundle of reflected rays converges and is approximately focused at a point, e.g., image point 26, having mirror symmetry through the center of curvature with respect to the object point. In other words, the resulting image is inverted with respect to the object. As a consequence a symmetric slit pattern must be used in order for the first slit pattern to be imaged upon the second slit pattern, as will be explained in more detail hereinafter.

Figure 2:
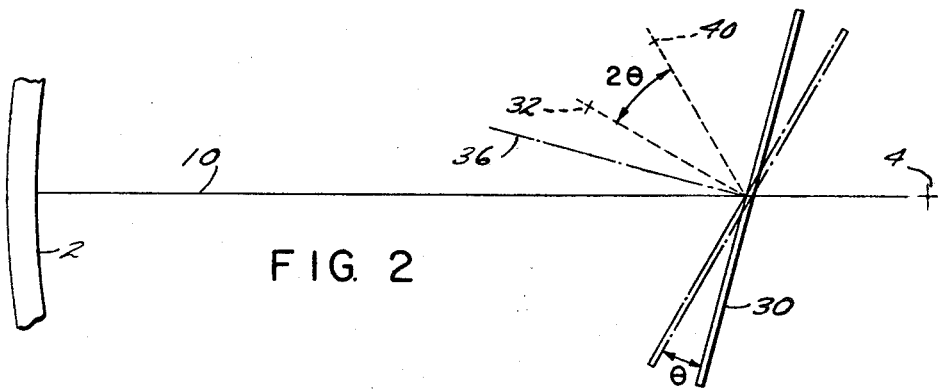
FIG. 2 illustrates the function of a rotating plane mirror.

A rotating mirror system is needed to cause the slit pattern to scan itself. This is accomplished by causing the apparent center of curvature of the concave mirror to move across the image plane in response to a rotation of a given shaft and involves the use of plane mirrors. The function of a plane mirror is merely to fold a line of sight, as shown for example in FIG. 2. In this figure the concave mirror is again indicated at 2, the center of curvature of the mirror is again identified at 4 and the line 10 again indicates the center ray. A plane mirror 30 is interposed to fold the line of sight for the center ray. If the mirror is first assumed to be in the position indicated in full lines in FIG. 2, then the true center of curvature 4 will be imaged at the position identified as 32, the center ray being reflected from the plane mirror 30 so as to make equal and opposite angles with respect to the local normal 36. If now the mirror 30 is rotated clockwise through an angle θ to the position shown in dotted lines, the image of the true center of curvature 4 will be rotated through an angle 2θ to a new position 40. Thus the single plane mirror 30 provides an angular gain factor of 2.

In the conception of this invention it has been recognized that a multiple plane mirror system employing rotatable mirrors will provide a still larger angular gain. Thus if a line of sight passes through a system of fixed and moving mirrors and if the line reflects alternately from fixed and moving surfaces, the angular gain of the system is $2n$, where $n$ is the number of moving mirrors. In other words such a multimirror system has the effect of gearing up the input shaft angle.

Figure 3:
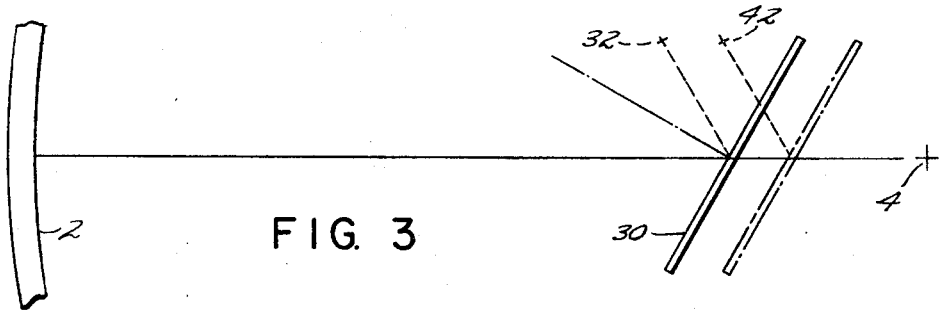
FIG. 3 illustrates how translation of a single mirror can cause image displacement.

Unfortunately any motion of a single mirror, whether deliberate or not, can cause an image displacement. The effect of a pure displacement is shown in FIG. 3 where the spherical mirror is again indicated at 2 and the plane mirror 30 again is interposed to fold the line of sight with regard to the true center of curvature 4. As explained with reference to FIG. 2, if the mirror 30 is in the position shown in full lines, the center ray will make equal and opposite angles with respect to the local normal and thereby cause the image of the true center 4 to appear at a point 32. However if the mirror is shifted to some other position as the one shown in dotted lines, then the image will shift to a new position 42. Such a shift in image will be attendant to a rotating mirror if it shifts even momentarily with respect to its center of rotation, e.g., if it is mounted on a rotating shaft which is subject to eccentricity. This result will occur with each shift of the mirror. Therefore, while a multimirror zero reference system is advantageous from the standpoint of offering large angular sensitivity, its use is complicated by the fact that each plane mirror introduces a displacement sensitivity.

In the conception of the present invention it has been determined that this displacement sensitivity can be eliminated by employing a system of symmetrically arranged mirrors. The multimirror systems hereinafter described are so designed as to prevent a ray which exits the mirror system from being displaced parallel to itself as a result of radial runout or misalignment of the shaft upon which the rotating mirrors are mounted. In other words the system is so designed that shifting of a rotating mirror in any direction due to shaft displacement has no effect on the exiting ray. At the same time the path length of a ray is unchanged as it travels through the mirror system. Hence defocusing of the optical system associated with the concave mirror is substantially eliminated.

Figure 4:
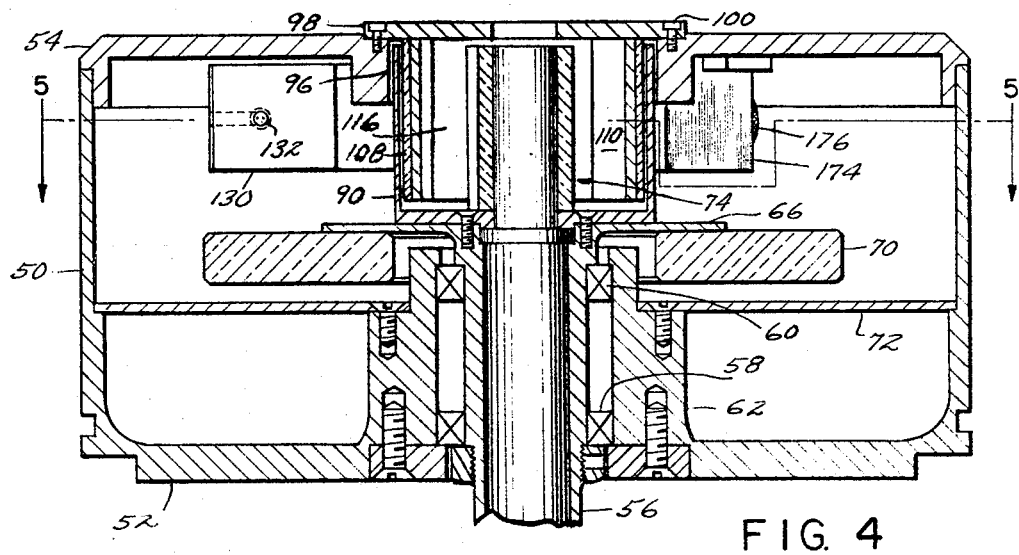
FIG. 4 is a vertical sectional view of an optical encoder comprising a preferred embodiment of the present invention, the view being taken along a line corresponding to line 4—4 in FIG. 5 with certain elements of the encoder omitted for convenience and clarity.
Figure 5:
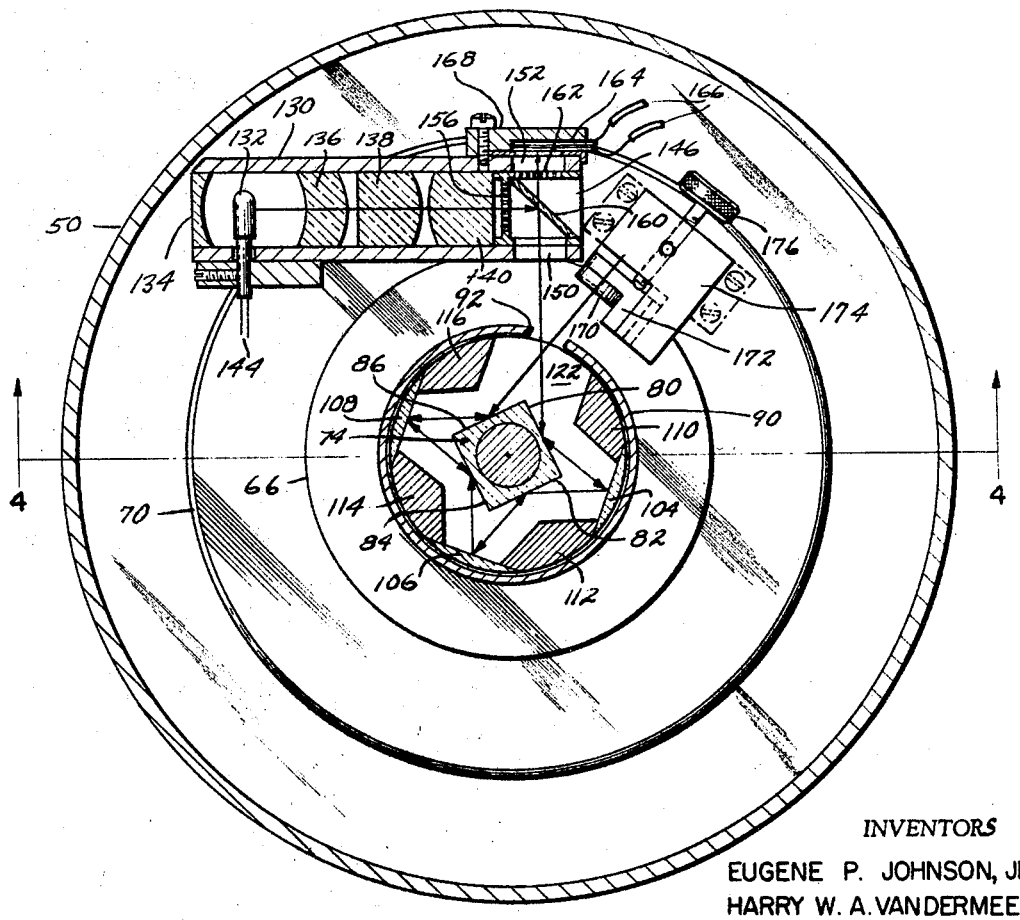
FIG. 5 is a plan sectional view of the same encoder taken along line 5—5 of FIG. 4.

Turning now to FIGS. 4 and 5, there is shown a portion of an encoder embodying a preferred form of zero reference system embodying the present invention which is insensitive to shaft displacement while simultaneously providing large angular sensitivity. For the sake of clarity and also for convenience, certain elements of the encoder structure are omitted.

To the extent shown in FIG. 4, the encoder comprises a casing 50 having an end wall 52 and a removable cover 54. Rotatably disposed in a center hole in end wall 52 is a hollow shaft 56. This shaft is supported by bearing members 58 and 60 mounted in a cylindrical sleeve 62 formed integral with end wall 52 on its inner side. Shaft 56 has a relatively thin flange 66 at its inner end to which is attached a code wheel 70 formed of optical glass. Although not shown, it is to be understood that the code wheel 70 is provided with one or more circular code tracks each made up of alternately occurring transparent and opaque code elements, and further that operatively associated with the code wheel are certain elements (not shown) forming a complete electrooptical system for deriving an electrical output indicative of shaft position in response to passage of a light beam through the code wheel as the latter rotates. The electrooptical system associated with the code disc is not shown since it forms no part of the present invention and since it may take several different well-known forms. However, it is to be noted that in practice certain components of such an electrooptical system may be arranged as a unitary subassembly mounted on a chassis plate 72 removably secured to sleeve 62 as shown in FIG. 4.

Attached to the inner or top end of shaft 56 is a mirror system identified generally at 74. As seen best in FIG. 5, mirror system 74 is of square cross-section, comprising identical planar faces 80, 82, 84, and 86. Mirror system 74 is secured to shaft 56 so as to rotate therewith without any relative motion.

Secured to the flange 66 is a cylindrical cup member 90. This cup rotates with shaft 56 and is provided with a slot 92 located symmetrically with respect to the central entering and exiting ray as viewed in FIG. 5 when shaft 56 is in zero position. The cover 54 has a center opening 96 sized to accommodate the upper end of cup 90 and an inverted cup-like stationary mirror assembly which fits within cup 90. The stationary mirror assembly comprises a plate 98 which overlies opening 96 and is secured to cover 54 by means of screws 100. The plate 98 carries on its inner surface three equally spaced identical mirrors 104, 106 and 108 and four opaque baffle members 110, 112, 114 and 116. The outer surfaces of these mirrors and baffle members have a circular contour so as to define a composite outer surface which is concentric with cup 90. Sufficient clearance is provided between cup 90 and the stationary mirror assembly to permit shaft 56 to rotate freely within the housing. As shown in FIG. 5, the inner surfaces of mirrors 104, 106 and 108 are planar and they are angularly spaced from each other at intervals of 90°. The four baffle members are identical, each comprising a pair of inner surfaces which are disposed at an obtuse angle to each other. Each baffle member cooperates with an adjacent baffle to define a narrow aperture for the mirror disposed between them. Preferably each baffle member is not only opaque but also nonreflecting. It is to be observed that since there are only three stationary mirrors and four baffles, there exists between baffles 110 and 116 an open area identified as 122 where via slot 92 light may enter the area between the rotatable mirror 80 and baffle 110.

The cover 54 carries still other elements of the zero reference system. These other elements include a cylindrical tube 130 which houses a lamp 132, a reflector 134 and a condensing system made up of lenses 136, 138 and 140. The lamp 132 has leads 144 which project outside of the tube and are connected to a suitable power supply (not shown). The condensing system produces a slightly converging beam directed at the end of the tube remote from lamp 132.

This remote or opposite end of the tube is open as shown at 146 and is also provided with a pair of diametrically opposed openings 150 and 152, the first of which permits light to pass transversely along a line passing into the open space 122 and intersecting mirror system 74 to one side of the axis of shaft 56. Mounted at this same end of the tube are several other optical elements. One element is a grating 156 having a series of slits disposed symmetrically about a center line which extends vertically into the plane of the drawing with respect to FIG. 5. Grating 156 is located just short of openings 150 and 152. Mounted just beyond grating 156 between openings 150 and 152 is a 50% beam splitter 160 which is disposed at a 45° angle to the axis of the condensing system and the grating 156. A second grating 162 is disposed in tube 130 in line with openings 150 and 152 and at a right angle to grating 156. Grating 162 is identical to grating 156. Behind grating 162 is a photocell 164 having leads 166 whereby it may be connected into an output signal generating circuit (not shown). The photocell is removably held in place on the outside of tube 150 by means of a bracket 168.

Also carried by cover 54 is a spherical mirror 170. The latter is held by a support 172 which is slidably mounted on a bracket 174 secured directly to the cover and which includes an adjusting screw 176 for moving the mirror along its axis to obtain proper focusing. Spherical mirror 170 is disposed so that its axis extends along a line passing into the open space 122 and intersects mirror system 74 to one side of the axis of shaft 56.

Operation of the system just described will now be explained with reference to FIG. 6 which schematically illustrates the path followed by the center ray of the beam produced by lamp 132 and its condensing system when shaft 56 is in zero position. The beam splitter 160 reflects the light beam onto the rotating mirror system 74. From mirror system 74 the beam is transmitted by reflection from the various moving and stationary surfaces to the spherical mirror 170 where it is inverted and reflected back along the same path to the mirror 160. The exact path followed by the light beam is as follows: starting at mirror 160, the beam strikes in turn mirrors 80, 104, 82, 106, 84, 108, 86, 170, 86, 108, 84, 106, 82, 104, 80 and 160. Since the mirror 160 is half transmitting, approximately half of the light initially directed at it from the lamp 132 will pass through it and out of the open end of the tube 130, and the remainder will be reflected to the rotating mirror system 74. Similarly, on the return path of the beam, mirror 160 will reflect part of the light back to the condensing system and will allow the remainder of it to travel toward the photocell 164.

On initially passing through the grating 156, the beam acquires a cross-sectional configuration or shadow pattern which coincides with the slit pattern of the grating. As reflected by the various mirrors and returned by the spherical mirror 170, the light rays will give an image formation of grating 156 that will coincide with the pattern of grating 162. The photocell 164 detects the quantity of light impinging upon it that is passed through the optical aperture defined by the grating 162. This quantity of light will be maximum when the shaft is in the zero position shown in FIGS. 5 and 6. If the shaft is rotated in one direction or the other from the zero position, the imaged slit pattern will move across the grating 162, scanning the pattern of that grating. As a consequence the quantity of light which is detected by the photocell will vary according to the number of slits of the image pattern which coincide with the number of slits of the second pattern.

Figure 6:
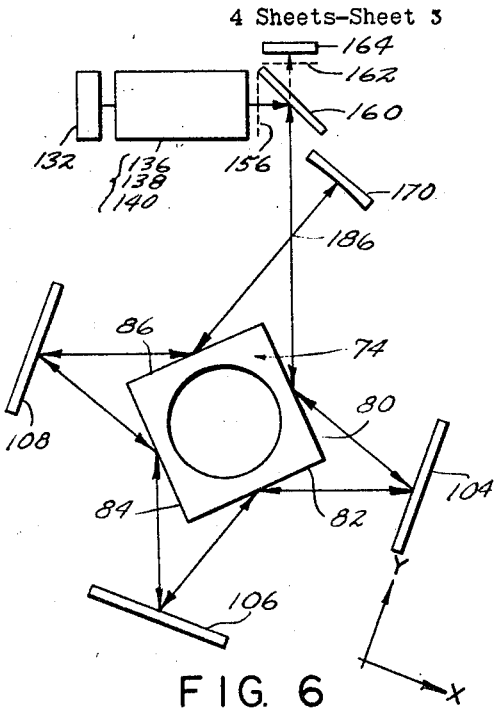
FIG. 6 is a schematic plan view of a preferred form of the invention and shows the path followed by the center ray of the light beam when the shaft is in zero position.

Because of the symmetry of the system, in the absence of cup 90 the path for the center ray shown in FIGS. 5 and 6 would be traversed not only each time the rotatable mirror assembly 70 is oriented in the zero position but again when each of the mirrors 82, 84 and 86 occupy the same position as mirror 80, i.e. maximum illumination of the photocell will occur not only at zero position but also when the shaft is rotated 90, 180 and 270 degrees from the zero position. However the maximum occurrence of illumination is limited to zero position by the slot in cup 90.

Cup 90 also assists the baffles 110–116 in cutting down stray reflections. At certain positions of the shaft, e.g., 10° removed from the position of FIG. 5 and in absence of cup 90, the light reflected from mirror system 74 will strike and be attenuated by one or more of the baffles. This baffling functions to keep the photocell dark except when the shaft is within a few degrees of zero position and, in the absence of cup 90, would provide a similar control at the 90, 180 and 270 degrees position of the shaft.

Figure 7:
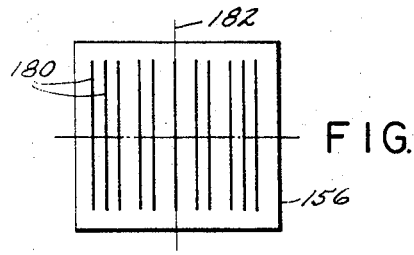
FIG. 7 illustrates one slit pattern arrangement suitable for the present invention.

The slit pattern common to the two gratings is so chosen that the number of apertures seen by the photocell will vary but is relatively small at all shaft positions except the zero position (or the 90, 180, or 270 degrees positions if the cup 90 is omitted) where the image of the first pattern coincides fully with the second pattern. Thus, as the slit pattern of the second grating is scanned by the image of the pattern of the first grating, the effective optical aperture for the photocell is modulated. The aperture vs. displacement characteristic of the rotating mirror system is a series of triangular pulses with the amplitude ratio between the largest pulse derived at full coincidence and the next largest pulse made great by selecting a pseudo-random distribution sequence for the slits whose autocorrelation function approximates an impulse. By way of example, but not of limitation, the grating 156 (and 162) may have a slit pattern as shown in FIG. 7. In this figure the grating is provided with a series of parallel but irregularly spaced slits 180 which are symmetrical about a center line 182. From left to right the spacing of the slits is as follows: 7, 8, 10, 6, 10, 10, 6, 10, 8 and 7 units of length with each length unit at least equal to slit width. With this grating the number of slits of grating 156 that can be imaged upon grating 162 at different shaft positions can be: 0, 1, 2 and 6. The last is full coincidence and can occur only at zero position (or at successive intervals of 90 degrees with cup 90 omitted). Thus the light detected by the photocell at zero shaft position will be at least three times as great as the light detected at any other position of the shaft where only partial coincidence can occur, whereby the signal-to-noise ratio of the output at zero position is substantial, permitting it to be processed unambiguously by state-of-the-art electronic circuitry. In practice it is preferred to use a grating having a much larger number of slits since this yields a more favorable light intensity distribution versus shaft angle. A grating having approximately 20 slits with an irregular pseudo-random spacing similar to the spacing shown in FIG. 7 has been used with excellent results.

Although not shown it is to be understood that a zero reference pulse is obtained from the pulse type output of the photocell by clipping and squaring that output at a level higher than the second largest pulse. The resolution of the derived reference pulse will be the angular width of the clipping level.

Figure 8:
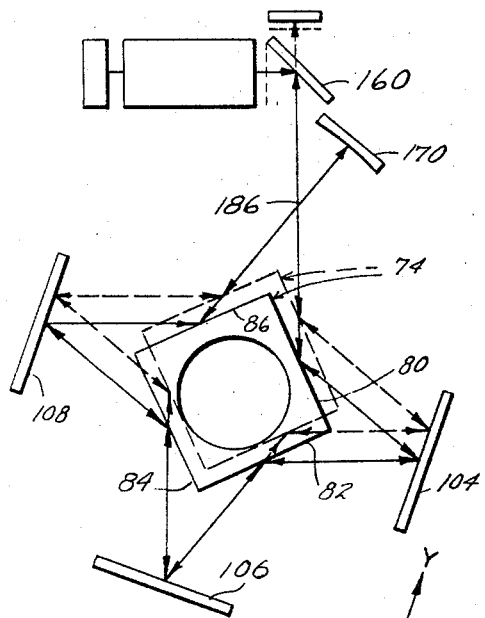
FIG. 8 is a view similar to FIG. 6 showing the path followed by the center ray when the shaft undergoes lateral displacement along a predetermined Y axis due to eccentricity.
Figure 9:
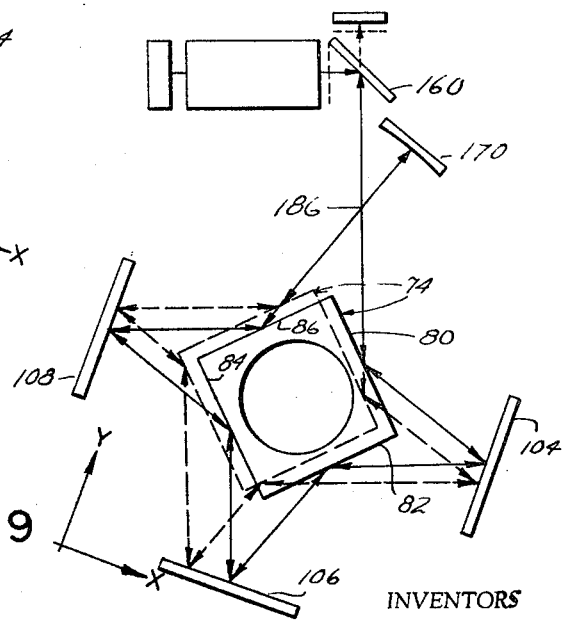
FIG. 9 is a view similar to FIG. 6 but showing the path followed by the center ray when the shaft undergoes lateral displacement along a predetermined X axis due to eccentricity.

At this point it is to be recognized that the multiple mirror system just described has substantially no displacement sensitivity. This highly important characteristic is illustrated by FIGS. 8 and 9. In these figures the rotatable mirror assembly 74 is shown in full lines in the same position as in FIG. 6. However, FIGS. 8 and 9 also show in broken lines two different positions for the rotatable mirror system which might occur because of shaft or bearing eccentricity. In FIG. 8 the mirror system is displaced along a predetermined Y axis while in FIG. 9 the shaft is displaced along the predetermined X axis extending at right angles to the Y axis. The normal and displaced paths of the center ray are also shown in full and broken lines respectively. As is evident from a comparison of the full and dotted line paths, the ray exiting the rotatable mirror system is not displaced parallel to itself even though the mirror assembly 74 has been displaced along the Y axis in FIG. 8 and along the X axis in FIG. 9. The ray exiting the mirror system follows exactly the same path as the ray entering the mirror system. While the center ray is displaced parallel to itself in moving from the mirror surface 80 to and from the mirror surface 86, it is not displaced on its travel between the beam splitter 160 and the rotating mirror 80 or between the rotating mirror 86 and the spherical mirror 170. This is true both in FIG. 8 and in FIG. 9. Consequently the total light path remains unchanged so that no defocusing will occur. This runout insensitivity property depends only on the symmetry of the mirror configuration and is completely independent of the number of mirror faces and of dimensions or dimensional ratios. What is important is that the mirror arrangement causes the light beam to move completely around the shaft 56, the central ray entering and leaving the rotation mirror system across a point 186 (FIGS. 6, 8 and 9) which is crossed by the same ray as it travels between the moving mirror 86 and the spherical mirror 170. The distance between point 186 and the axis of the rotating mirror system is the same as the distance from the same axis to each of the stationary mirrors 104, 106 and 108 along a line drawn at right angles to each of said stationary mirrors.

The spherical mirror 170 performs three functions. One function is to image the pattern. The second function is to increase the angular resolution by reflecting the light beam back through the same mirror system so that the optical gain is not just twice the number of moving mirrors but four times the number of moving mirrors, a doubling of gain occurring at each moving mirror on the forward path and again on the return path. The third function is to increase the angular resolution of the zero reference system by maximizing the radius of curvature of the spherical mirror since this radius is a linear function of the angular resolution and is limited only by space requirements and not by the radius of the encoder wheel nor by the line frequency of the encoder pattern on this wheel. The system is designed so that the distance between the grating 156 and the spherical mirror 170 is identical to the distance between the spherical mirror 170 and the grating 162, both distances being equal to the radius of curvature of the spherical mirror. In other words, the center of curvature of the mirror is located in the plane of the two slit patterns. This provides optimum focusing which is in no way affected by displacement of shaft 56 since the path length of the ray from the beam splitter 160 through the rotating mirror system and back to the beam splitter 160 is unchanged regardless of the direction in which the shaft is displaced.

As indicated previously, cup 90 causes a reference pulse to be obtained only at zero position and four reference pulses would be generated for each revolution of the shaft if cup 90 were not present. However, the same results may be achieved without cup 90 but using other means. Thus, for example, the pulses could be counted in a counter adapted to yield a single reference pulse for every fourth input pulse. Alternately, it is possible to utilize an "and" gate circuit which is conditioned to pass an output pulse derived from the clipped and squared output of the photocell each time the shaft is in a limited portion of its cycle which includes the zero position. The "and" circuit could be conditioned by a pulse derived from a generator independent of the zero reference system which is triggered by a mechanically or optically operated switch. The photocell derived output pulse occurring at the zero position would be passed by the "and" gate circuit while the other output pulses occurring at 90, 180 and 270 degrees would be blocked.

Of course it also is possible to modify the system to get a reference pulse at more than one but less than four positions. Thus, for example, it is possible to provide cup 90 with two opposed slots 92 so as to get reference pulses at 180° intervals.

Figure 10:
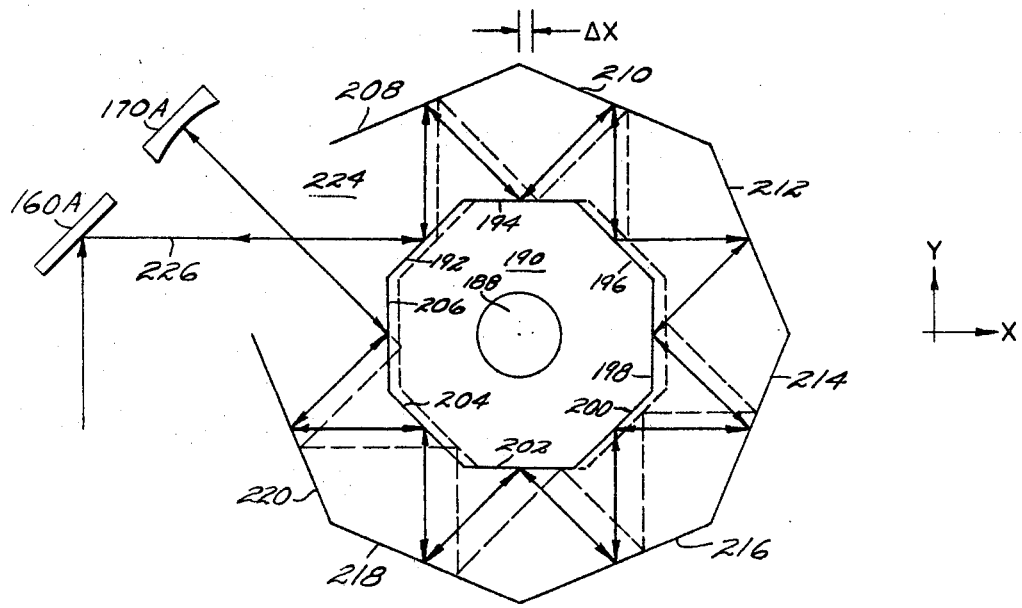
FIGS. 10 and 11 are schematic views somewhat similar to FIGS. 8 and 9 but showing a system having a greater number of reflecting surfaces.
Figure 11:
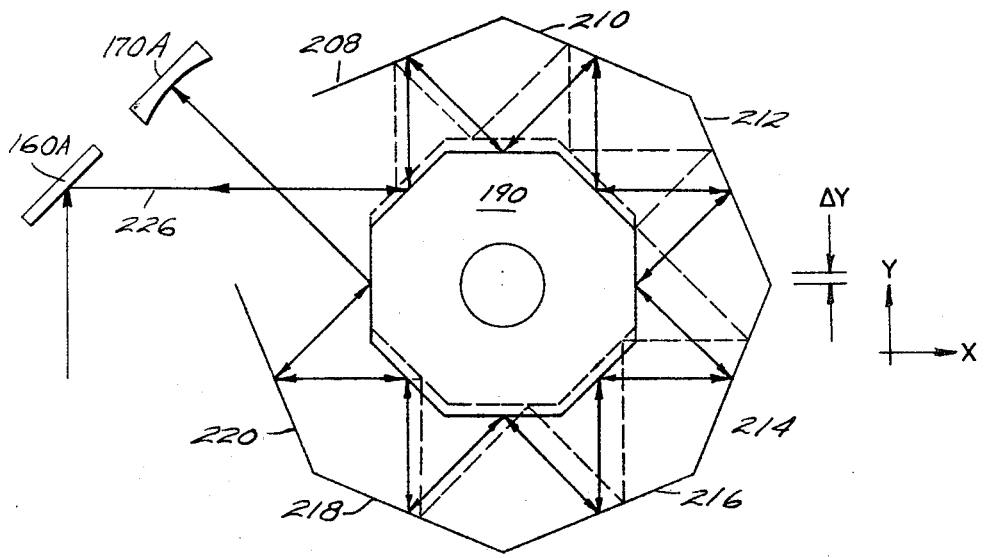

It is to be noted also that the invention is not limited to a "four mirror" system. Other mirror systems symmetrical in nature also may be used. FIGS. 10 and 11 illustrate an "eight mirror" system. In this case, a rotatable shaft 188 carries a mirror assembly 190 having eight planar mirrors 192, 194, 196, 198, 200, 202, 204, and 206. Surrounding these rotatable mirrors are seven stationary planar mirrors 208, 210, 212, 214, 216, 218 and 220. Since the stationary mirrors total one less than the number of rotating mirrors, there remains an open area 224 whereby a light beam may be directed at the rotating mirror assembly via a beam splitter 160A. Also embodied in the system is a spherical mirror 170A occupying substantially the same position as the mirror 170 in FIGS. 5 and 6. Although not shown, it is to be understood that the light beam, represented by the center ray 226, is generated by the same optical system as the one shown in FIG. 5. The beam enters the optical mirror system to one side of the shaft 188 so as to strike the mirror of mirror assembly 190 which occupies the position of the mirror 192 in FIG. 10. The beam will be reflected in alternate succession by the stationary and rotating mirrors to the spherical mirror 170A. On striking the latter, it will be reflected back to the rotating mirror assembly where it will first strike and be reflected by the mirror occuping the position of mirror 206 in FIG. 10. Then it will be reflected in turn by successive stationary and rotating mirror surfaces back to the mirror 160A where half of the intensity will pass through to the output stage.

As is readily seen from FIGS. 10 and 11, displacement of the rotatable mirror assembly along X and Y axis respectively as shown in broken lines will cause the center ray 226 to be displaced parallel to itself in moving through the rotating mirror system except on the entrance and exit legs respectively running from the mirror 160A to the rotating mirror assembly and the legs extending between the rotating mirror assembly and the spherical mirror 170A. Thus, just as with the embodiment of FIGS. 4 and 5, the zero reference system of FIGS. 10 and 11 provides large angular sensitivity without displacement sensitivity. The angular gain factor of the system of FIGS. 10 and 11 is four times the number of rotating mirror surfaces or 32.

The present invention is believed to offer several advantages. First of all, it offers a system which is not only reliable but which provides a high resolution capability without any runout sensitivity. Secondly, the system can be incorporated in existing optical encoding systems without modification of the mode of operation of the latter. Thirdly the system is rugged and compact, uses elemental optical components and can be so constructed that access for removal and repair or replacement of parts its an easy matter. A fourth advantage is that it is not limited in applications to encoders but may be used anywhere that it is desired to get a precise indication that a rotating member has reached a predetermined reference position, e.g. 0, 90, 180, 270 degrees.

Obviously many other modifications and variations of the present invention are possible in the light of the foregoing teachings. For example, it is not necessary to have two separate gratings. Instead it is possible to use a single grating by illuminating one-half, e.g., the bottom half and projecting the image upon the other half, as taught in U.S. Patent No. 3,326,077 to Harry Vandermeer, issued June 20, 1967, for Electrooptical Device. In using a single grating it is possible for the condensing system axis to be at right angles to the initial line of incidence of the beam with the rotating mirror as in FIG. 6. Alternatively it is possible to rotate the condensing system 90° so that it is in line with the initial line of incidence of the beam with the rotating mirror. This modification eliminates the need for a mirror oriented 45° like the mirror 160. It is to be understood, therefore, that the invention is not limited in its application to the details of construction and arrangement of parts specifically described or illustrated, and that within the scope of the appended claims, it may be practiced otherwise than as specifically described and illustrated.

What is claimed is:

1. A zero reference indicator for providing a signal indicative of a predetermined angular position of a rotatable shaft, said indicator comprising:
   means for forming a light beam;
   a first grating member having a selected slit pattern;
   a second grating member having a selected slit pattern;
   optical means for superimposing an image of said first slit pattern onto said second slit pattern; and
   light responsive means operative in response to light from said superimposed slit patterns to produce a signal indicative of the angular position of said rotatable shaft, said optical means including:
      a multifaced mirror mounted for rotation on said shaft, said mirror having a plurality of contiguous reflecting surfaces forming a symmetrical closed polygon;
      a plurality of stationary mirrors each circumferentially disposed about said multifaced mirror the same predetermined distance from the axis of rotation of said shaft;
      means for directing said light beam at a first seselected one of said reflecting surfaces;
      said multifaced mirrors and said stationary mirrors being disposed relative to each other to cause reflection of said light beam along an incident path in alternate succession by each of said multifaced mirrors and stationary mirrors;
      a spherical mirror positioned to receive light from a second selected one of said reflecting surfaces adjacent said first selected one of said reflecting surfaces after reflection by each of said multifaced and stationary mirrors, and to reflect said light back along the same path as the incident light; and
      light responsive means positioned to receive light reflected from said first selected one of said reflecting surfaces and operative to provide a signal indicative of the angular position of said shaft.

2. A zero reference indicator according to claim 1 wherein said optical means includes a beam splitter disposed between said light beam forming means and said first selected reflecting surface, and operative to reflect the light beam from said beam forming means onto said first selected reflecting surface, said beam splitter being also disposed between said second grating member and said first selected reflecting surface and operative to transmit light from said first selected reflecting surface to said second grating member.

3. A zero reference indicator according to claim 1 wherein said multifaced mirror has $n$ reflecting surfaces and said plurality of stationary mirrors has $n-1$ reflecting surfaces.

4. A zero reference indicator according to claim 1 wherein said multifaced mirror has four reflecting surfaces and said plurality of stationary mirrors numbers three.

References Cited
UNITED STATES PATENTS 3,326,077  6/1967  Vandermeer _____ 88—14

OTHER REFERENCES

Garbuny et al.: Method for the Generation of Very Fast Light Pulses, Review of Scientific Instruments, vol. 28, No. 10, October 1957, pp. 826–827.

JEWELL H. PEDERSEN, *Primary Examiner.*

A. A. KASHINSKI, *Assistant Examiner.*